(12) United States Patent
Vijayasankar et al.

(10) Patent No.: US 10,594,360 B2
(45) Date of Patent: Mar. 17, 2020

(54) ENHANCED CHANNEL HOPPING SEQUENCE

(71) Applicant: TEXAS INSTRUMENTS INCORPORATED, Dallas, TX (US)

(72) Inventors: Kumaran Vijayasankar, Allen, TX (US); Timothy Schmidl, Dallas, TX (US); Ramanuja Vedantham, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/983,136

(22) Filed: Dec. 29, 2015

(65) Prior Publication Data

US 2016/0344443 A1    Nov. 24, 2016

Related U.S. Application Data

(60) Provisional application No. 62/165,621, filed on May 22, 2015.

(51) Int. Cl.
| | | |
|---|---|---|
| *H04B 1/7143* | (2011.01) | |
| *H04B 1/715* | (2011.01) | |
| *H04W 16/14* | (2009.01) | |
| *H04B 1/713* | (2011.01) | |

(52) U.S. Cl.
CPC ........... *H04B 1/7143* (2013.01); *H04B 1/713* (2013.01); *H04B 1/715* (2013.01); *H04B 2001/7154* (2013.01); *H04W 16/14* (2013.01)

(58) Field of Classification Search
CPC .............. H04B 1/7143; H04B 1/715; H04B 2001/7154; H04B 1/713; H04W 16/14; H04W 72/08
USPC ........................................................ 375/133
See application file for complete search history.

(56) References Cited

U.S. PATENT DOCUMENTS

| | | | | |
|---|---|---|---|---|
| 5,887,022 A | * | 3/1999 | Lee .................. | H04B 1/713 370/330 |
| 2004/0203398 A1 | * | 10/2004 | Durrant ............. | H04W 16/10 455/63.1 |
| 2005/0118951 A1 | * | 6/2005 | Poursabahian ...... | H04L 29/06 455/41.2 |
| 2008/0238807 A1 | * | 10/2008 | Ibrahim ............. | H01Q 21/29 343/876 |
| 2009/0010309 A1 | * | 1/2009 | Bernett ............. | H04B 1/715 375/135 |
| 2010/0207754 A1 | * | 8/2010 | Shostak ............. | B60C 23/041 340/450 |
| 2014/0126388 A1 | * | 5/2014 | Shin ................. | H04W 48/20 370/252 |
| 2016/0005292 A1 | * | 1/2016 | Carroll ............. | G08B 21/088 340/539.13 |

* cited by examiner

*Primary Examiner* — Leila Malek
(74) *Attorney, Agent, or Firm* — Brian D. Graham; Charles A. Brill; Frank D. Cimino

(57) ABSTRACT

A system and method for enhanced channel hopping sequence is described. A pseudo random channel hopping sequence is redistributed using certain system specific parameters for separating adjacent transmission channels within a predetermined number of consecutive transmission channel numbers in the random channel hopping sequence to improve inter-channel interference between adjacent transmission channels.

16 Claims, 5 Drawing Sheets

ENHANCED CHANNEL HOPPING SEQUENCE

CROSS-REFERENCE TO RELATED APPLICATIONS

This application claims priority to the U.S. provisional patent application Ser. No. 62/165,621, filed May 22, 2015, the entirety of which is hereby incorporated herein by reference for all purposes.

TECHNICAL FIELD

This disclosure relates generally to the field of wireless communication and more specifically to wireless transmission using frequency hopping sequences.

BACKGROUND

Channel Hopping is a mechanism by which a transmitter 'hops' through or moves to different channels (frequency bands) during its normal operation. A data exchange between nodes may happen on a single channel or multiple channels depending on the different protocols. Although nodes hop on multiple channels, a single transmission and reception happens only on one of those channels. The channel hopping increases network throughput by promoting simultaneous data transfer over multiple channels between different pairs of nodes and improves reliability in rough channel conditions by exploiting the channel diversity.

One application of channel hopping is Frequency Hopping Spread Spectrum (FHSS). FHSS is a method of transmitting radio signals by switching carriers among many frequency channels using a pseudorandom sequence known to both transmitter and receiver. In such systems, signal transmitters rapidly switch carrier frequencies using various "hopping" schemes to avoid the problem of signal interference at a particular frequency. However, for such systems to operate, the TX and RX pair have to align on the spreading sequence to be used as it requires PHY level synchronization.

Other methods to achieve channel hopping involves changing of channel at PHY level as directed by MAC. However, a single frame exchange is performed only on one channel or few channels. Frequency hopping allows transmitting devices to use various carrier frequencies to enhance the signal transmission in various different transmission environments. In frequency hopping systems, signals experience different sets of interference during each "hop" and thus avoid possible constant interference at a particular frequency. Frequency hopping is commonly used for transmission in Wireless Local Area Networks (WLAN), Global System for Mobile Communications (GSM), Bluetooth, and various other communication systems. Channel hopping wireless transmission system protocols typically have a retransmission mechanism to retransmit lost packets. When channel hopping is used, subsequent retransmissions can use a different channel in the channel hopping sequence. This helps avoiding channel interference that may have existed in the previous channel causing the packet loss.

Channel hopping can be achieved through many different implementations. Some of the common implementations include synchronous method such as Time Slotted Channel Hopping (TSCH) or asynchronous method such as unslotted channel hopping as defined by Part 15.4, Low-Rate Wireless Personal Area Networks (LR-WPANs), IEEE 802.15.4e, 2012. Channel hopping schemes are used for various applications for example, Wi-SUN Alliance has proposed a Field Area Network (FAN) specification that specifies the use of channel hopping for smart grid applications.

Existing channel hopping schemes have following requirements:

The next channel in frequency hopping sequence must be at least pseudo random.

All channels must be equally distributed.

The random sequence must be repeatable so that it can be communicated to receivers.

These channel hopping schemes do not account for Inter Channel Interference ("ICI"). When a channel is not suitable for transmission due to interference, then typically it affects the data packet transmission in adjacent channels or even a few channels adjacent to it as well. Some of the commonly known random sequences for channel hopping mechanism are Linear Feedback Shift Register (LFSR) and Linear Congruential Generator (LCG).

These schemes generate pseudo random sequences; however, they do not account for inter channel interference. Although the sequences are random, they do allow for next channels in the list to be close to the current channel, for example, if a packet is dropped due to bad channel conditions, then the possibility is that the retransmission may occur in a channel that is closer to the previous channel and the retransmission may also fail due to the inter channel interference from the previous channel. Most wireless systems have retransmission limits for transmission efficiency purposes and if a packet retransmission reaches the maximum limit for retransmission, then the entire transmission session has to be restarted. This results in multiple transmission sessions and causes waste of system resources and poor bandwidth utilization.

Referring to FIG. 1, an example of a conventional implementation of a Linear Feedback Shift Register scheme is illustrated. The example illustrates the percentage of adjacent channel interference across a number of channel hopping separations ($N_{sep}$) for a LFRS sequence when the number of retransmissions limit is set to 6. The amount of adjacent channel interference in the sequence was computed by measuring the number of channels in a sequence that are within $N_{sep}$ distance from the previous "retransmission count" channels. As illustrated, when the $N_{sep}$ is increased, the percentage of adjacent channel interference increases exponentially.

SUMMARY

In accordance with an embodiment an apparatus is disclosed. The apparatus includes a transceiver unit, and a processing unit coupled to the transceiver. The processor unit is configured to transmit data packets via the transceiver unit using a frequency hopping sequence in a wireless communication network, the frequency hopping sequence includes a plurality of transmission channel numbers, and adjacent transmission channel numbers within a predetermined number of consecutive transmission channel numbers in the frequency hopping sequence are at least a predetermined distance apart.

In accordance with another embodiment an apparatus is disclosed. The apparatus includes, a transceiver; and a processing unit coupled to the transceiver. The processing unit is configured to generate a first frequency hopping sequence of transmission channel numbers for transmission in a wireless communication network, determine whether a distance between adjacent transmission channel numbers within a predetermined number of consecutive channel numbers in the first frequency hopping sequence of transmission channel numbers is less than a predetermined threshold distance, if the distance between adjacent transmission channel numbers within the predetermined number of consecutive channel numbers in the first frequency hopping sequence is less than the predetermined threshold distance, rearrange the first frequency hopping sequence of transmission channel numbers to generate a second frequency hopping sequence of transmission channel numbers, and transmit data packets in the wireless communication system using the second frequency hopping sequence of transmission channel numbers.

In accordance with another embodiment a method is disclosed. The method includes generating by a processing unit, a first frequency hopping sequence of transmission channel numbers for transmission in a wireless communication network, determining by the processing unit whether a distance between adjacent transmission channel numbers within a predetermined number of consecutive channel numbers in the first frequency hopping sequence of transmission channel numbers is less than a predetermined threshold distance, if distance between adjacent transmission channel numbers within the predetermined number of consecutive channel numbers in the first frequency hopping sequence of transmission channel numbers is not equal to at least the predetermined threshold distance, rearranging by the processing unit the first frequency hopping sequence of transmission channel numbers to generate a second frequency hopping sequence of transmission channel number, and transmitting by the processing unit data packets in the wireless communication system via a transceiver unit using the second frequency hopping sequence of transmission channel numbers.

DETAILED DESCRIPTION

The following description provides many different embodiments, or examples, for implementing different features of the subject matter. These descriptions are merely for illustrative purposes and do not limit the scope of the invention. Specific examples of components and arrangements are described below to simplify the present disclosure. These are, of course, merely examples and are not intended to be limiting.

Figure 1:
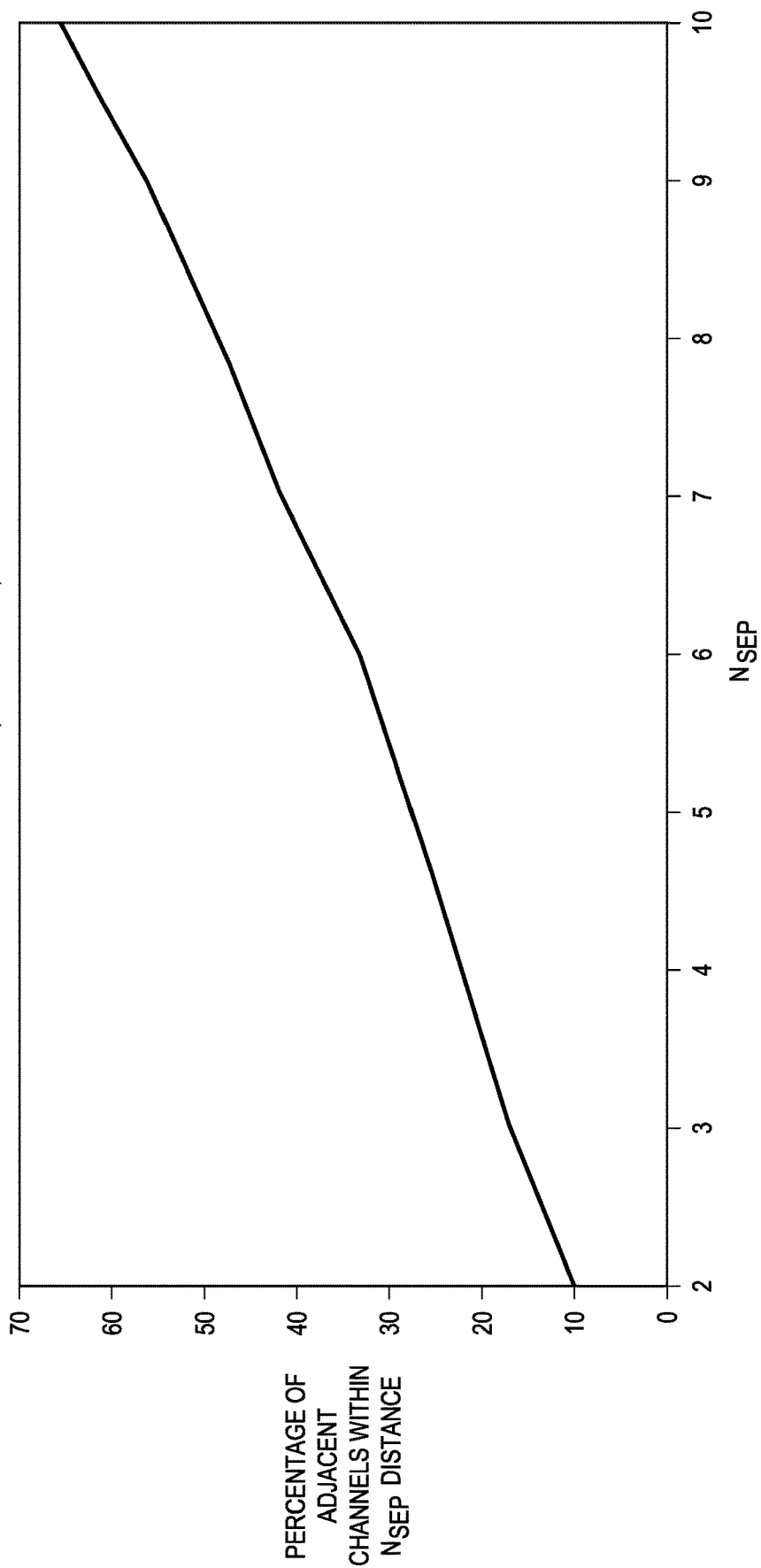
FIG. 1 illustrates an example of a conventional implementation of a Linear Feedback Shift Register scheme with inter channel interference.
Figure 2:
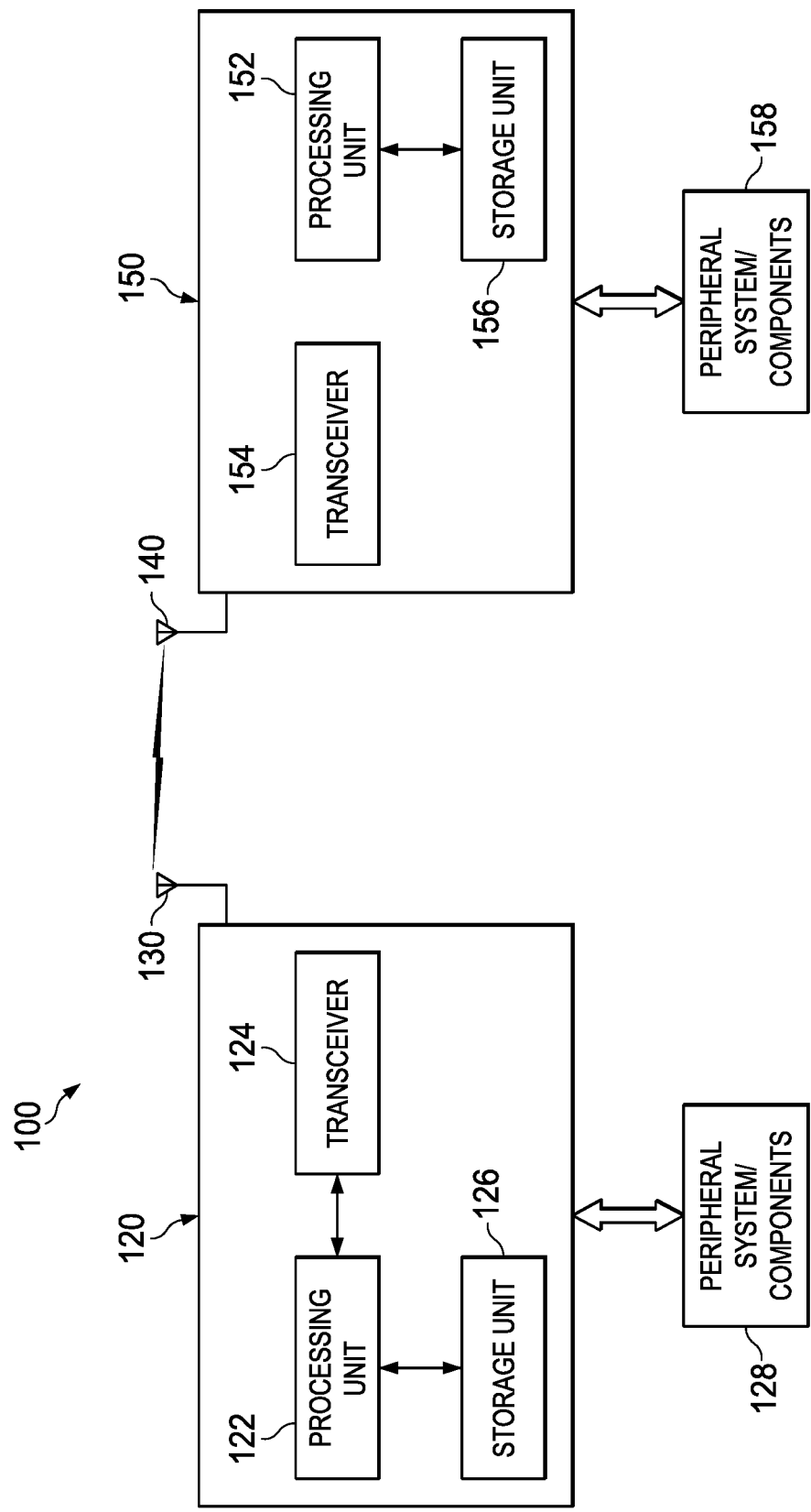
FIG. 2 illustrates an exemplary system for wireless communication using an enhanced channel hopping sequence according to an embodiment.

Referring to FIG. 2, an exemplary system 100 for wireless communication is illustrated according to an embodiment. System 100 includes two wireless communication devices 120 and 150. Each device includes a processing unit (122, 152), a transceiver (124, 154), an antenna system (130, 140), and a storage unit (126, 156). Each device may further be coupled to optional external peripheral systems/components (128, 158). The system units illustrated here are for explanatory purposes only. Devices 120 and 150 can also include various other components and units such as multiple processing units, display, keyboard or other user interface mechanisms, multiple antennas, multiple storage devices, and various other elements needed for devices to function in a given application. Further, devices 120 and 150 can be any wireless communication devices such as wireless phones, computers with wireless communication capability, point-of-sale units, industrial control units, smart meters, printers, or any other device, system, or the like suitable for wireless communication application. Devices 120 and 150 can communicate with each other via a wireless communication link using various different wireless communication protocols such as Bluetooth, IEEE 802.15, WiFi, and others. In an exemplary embodiment, devices 120 and 150 communicate with each other using frequency hopping or channel hopping schemes.

When device 120 communicates with the device 150, the processing unit 122 can process data to be communicated to device 150. Processing unit 122 can generate various data packets according to any given communication protocol application and then control the transceiver 124 to process and transmit data packets to device 150 using antenna 130. When the transceiver 154 of device 150 receives the data packet via antenna 140, it processes and forwards data packets to the processing unit 152 for further processing. When a channel hopping scheme is used for communication between the device 120 and the device 150, the processing unit 122 of device 120 establishes a communication session with the device 150 by initiating a session parameter exchange with the device 150. The session parameter exchange establishes a certain understanding between the two devices as to protocols and parameters that can be used for the communication session. The communication session can be established according to procedures defined by the communication protocol used for the particular communication session.

According to another embodiment, when devices 120 and 150 use a channel hopping scheme for communication, then the transmitting device (e.g., device 120) generates a pseudo random sequence of transmission channel numbers for channel hopping using known methods such as a standard hash function or the like. In conventional schemes, a transmitting device transmits parameters for generating the pseudo random sequence and other transmission parameters to the receiving device during the session initiation message exchange and then retransmits these parameters to the receiver according to the communication protocol used for transmission. For example, for Time Slotted Channel Hopping (TSCH) scheme, parameters are repeatedly transmitted in periodic beacons. For asynchronous channel hopping, parameters are transmitted to the receiver randomly in certain control messages.

In conventional systems, a transmitter generates a random channel hopping sequence and then transmits parameters for generating the random channel hopping sequence to a receiver. The receiver uses parameters to generate the same random channel hopping sequence as the transmitter to align on the channel to be used for transmitting and receiving data packets. The random channel hopping sequence may include adjacent channel numbers that are also physically adjacent in the frequency bands. For example, the random frequency hopping sequence may include channel numbers 2 and 3 as adjacent channel numbers in the frequency hopping sequence; however, channel 2 and 3 may also be physically adjacent in the transmission frequency band. If one of the channels, say channel 2, is noisy and a packet is transmitted in channel 2 and drops, then the transmitter will retransmit the packet in channel 3, which is next in the sequence regardless of the channel interference experienced by previous packet in channel 2, which may also affect transmission in channel 3. As explained hereinabove, this can cause high error rates and performance degradation if random channels are placed close to each other and retransmission occurs in a channel that is closer to a noisy channel.

According to an exemplary embodiment, when device 120 establishes communication with the device 150, the device 120 generates a pseudo random channel hopping sequence for transmission and then creates another frequency separated channel hopping sequence from the pseudo random channel hopping sequence. The resulting frequency separated channel hopping sequence is also random; however, it is rearranged based on certain parameters to ensure that adjacent channel numbers are at least some distance apart so if a data packet is dropped or not received by the receiver due to some channel interference, then the retransmission of the packet occurs on a channel that is at least a given distance away from the previous channel. The retransmission channel is then not affected by the interference of the previous transmission channel and the throughput of the system increases significantly.

The distance between adjacent channels can be determined based on various different factors. In another embodiment, the number of times a data packet can be retransmitted according to the communication system transmission protocol, is used as a distance measure for a number of consecutive channels to be rearranged in the enhanced frequency hopping sequence. For example, if the communication system protocol limits the retransmission of data packets to 'N' times, then the distance between channels within 'N' number of consecutive channels in the enhanced frequency hopping sequence can be adjusted to ensure they are at least some predetermined threshold distance apart from each other and thus are not affected by inter-channel interference for retransmission. A variation of parameter 'N' can also be used as a measure of the number of consecutive channels to be analyzed such as N+X, N−X, N/X, or N*X, where X can be any number chosen for a particular system implementation In another embodiment, N−1 may be used as the number of consecutive channels to be reviewed and rearranged in the random frequency hopping sequence to ensure channel numbers within the N−1 number of consecutive channel numbers in the frequency hopping sequence are not within a predetermined distance from each other so they are not affected by the inter-channel interference. The number 'N' or variation thereof can be used by device 120 as a parameter or a threshold to determine whether the distance between adjacent channels within 'N' (or combination thereof) consecutive channels in the frequency hopping sequence is such that they will not be affected by inter-channel interference from each other. The distance between channels to avoid inter-channel interference within a given number of consecutive channels in the enhanced frequency hopping sequence can be predetermined based on channel conditions and system environment or it can be dynamically adjusted by the system based on the history of packet loss for particular given channel or channel performance measurements.

In an exemplary implementation, if the system retransmission limit is three (3), then for a given channel number 'Y', if next three channels from channel 'Y' in the frequency hopping sequence are not a predetermined threshold distance apart from each other in frequency, then the device 120 can rearrange the frequency hopping sequence to ensure that each of the three channels is at least predetermined distance away from the adjacent channel. In an embodiment, the number of times a packet can be retransmitted 'N' can also be used as the distance between adjacent channels in the enhanced frequency hopping sequence. In some other embodiment, the distance between adjacent channels in the number of selected consecutive channels can be any variation of 'N' thereof. In a further embodiment, 'N' can be based on the maximum expected adjacent channel leakage. In a particular system, for example, if a noisy or leaky channel is expected to affect the next two channels, then the value of 'N' can be greater than two to ensure that two adjacent channels in the sequence are at least two channels distance apart or the like so the noisy channel does not affect the retransmission of packets. In general, the distance between two adjacent channels can be greater than the maximum expected adjacent channel leakage for the system to ensure error free retransmission.

The threshold distance parameter and the number of consecutive channels to be used for analysis can be communicated by device 120 to device 150 (or visa-versa) during session initiation stage of the communication so both transmitter and receiver devices can be synchronized for random channel hopping. Further, as explained above, the parameter or threshold can be transmitted periodically or asynchronously depending on the type of channel hopping system protocol used for a particular given implementation of transmission between devices 120 and 150. The choice of distance between adjacent channels can be based on various different factors such as the history of data packet transmission failure, error rates, general physical environment of the transmission system (crowded concrete structures, remote areas, line of sight analysis, etc.), or the like.

Figure 3:
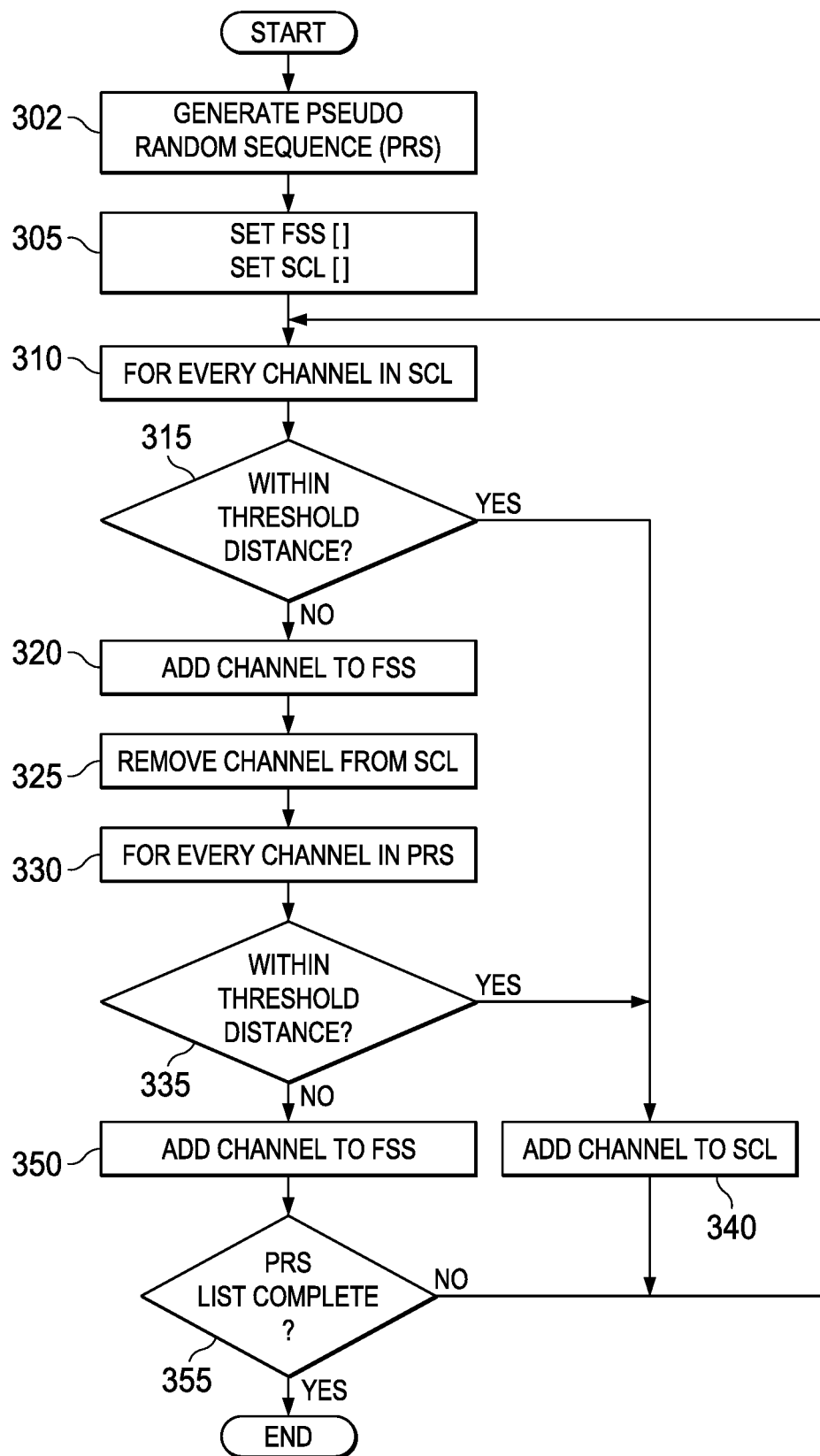
FIG. 3 illustrates an exemplary flow diagram for generating a frequency separated channel hopping sequence according to another embodiment.

Referring to FIG. 3, an exemplary flow diagram 300 for an exemplary method of generating frequency separated channel hopping sequence according to another embodiment is illustrated. The method can be performed by any device such as transmitting devices 120 or 150. Initially, at 302, the device generates a pseudo random sequence (PSR) for channel hopping. At 305, an empty Frequency Separated Sequence (FSS) and an empty Skipped Channel List (SCL) are created in the memory by the device. At 310, if the SCL is empty the process continues at block 330. Otherwise, the device selects a channel from the SCL and determines at 315 whether the selected channel is within the threshold distance from the previous channel in the FSS. If the selected channel is within the threshold distance from the previous channel, then at 340, the selected channel remains in the SCL. If the selected channel is not within the threshold distance from the previous channel, then at 320, the device adds the channel to the FSS and removes it from the SCL at 325. As explained hereinabove, the threshold distance can be selected based on system application or a retransmission limit for each channel.

At 330, the device selects a channel from the PRS and for each channel from the PRS, the device determines whether the channel is within the threshold distance from the previous channel in the FSS. If the selected channel is within the threshold distance from the previous channel, then at 340, the device adds the selected channel to the SCL. If the selected channel is not within the threshold distance from the previous channel, then at 350, the device adds the channel to the FSS and at 355 determines if all the channels from the PRS have been considered for channel separation. If all the channels have not been considered for channel separation, then the device continues until all channels from the PRS have been separated from an adjacent channel by at least the threshold distance and added to the FSS.

The frequency separated sequences generated by the device using this method are also random as they are based on an initial random sequence and channels are uniformly distributed. The frequency separated sequence can be generated by any element of devices 120 and 150. For example, the processing units 122 (or 152) can generate the random sequence and separate all channels using the method or the sequence can be generated by the transceiver 124 (or 154), or any other system component. While an exemplary method is illustrated in FIG. 3, one skilled in the art will appreciate that using the teachings of the disclosure, other methods can be implemented to separate channels in a random channel hopping sequence.

Figure 4A:
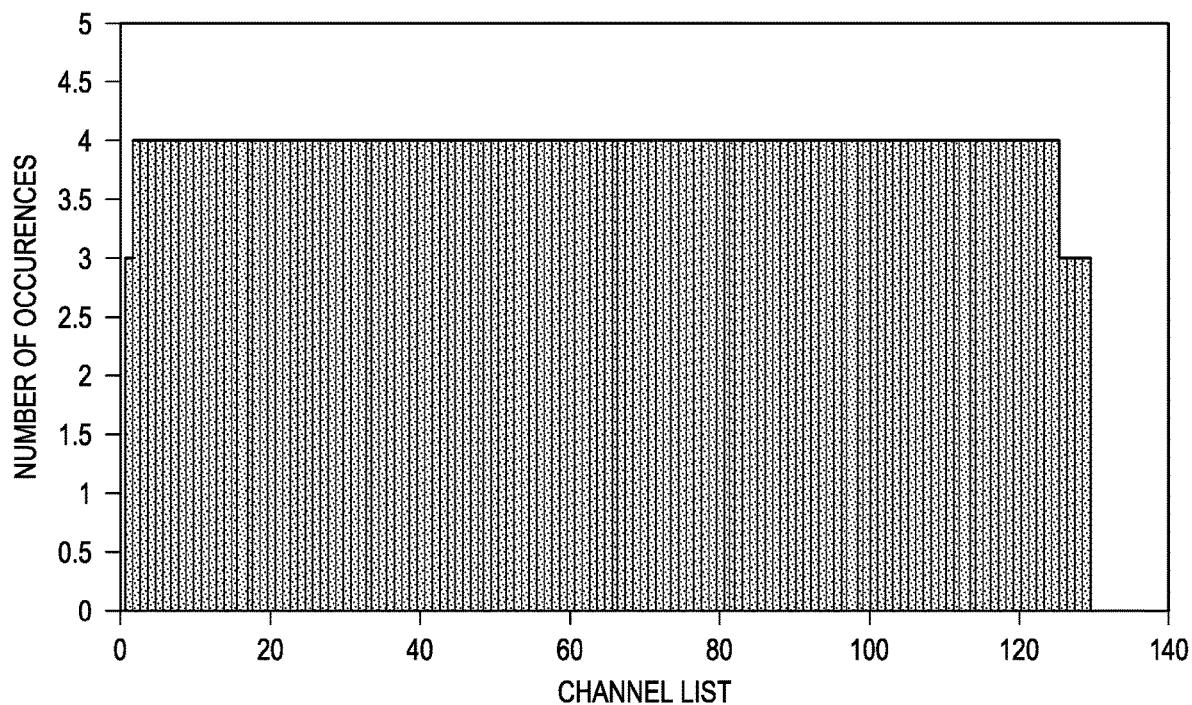
FIG. 4A illustrates an example of distribution of channels using a pseudo random sequence generated by a Linear Feedback Shift Register (LFSR) method.

Referring to FIG. 4A, an example of distribution of 129 channels using a pseudo random sequence generated by a Linear Feedback Shift Register (LFSR) method is illustrated. All channels are uniformly distributed; however, because the LFSR method can generate the sequence with channels closer to each other, the inter-channel interference cannot be avoided.

Figure 4B:
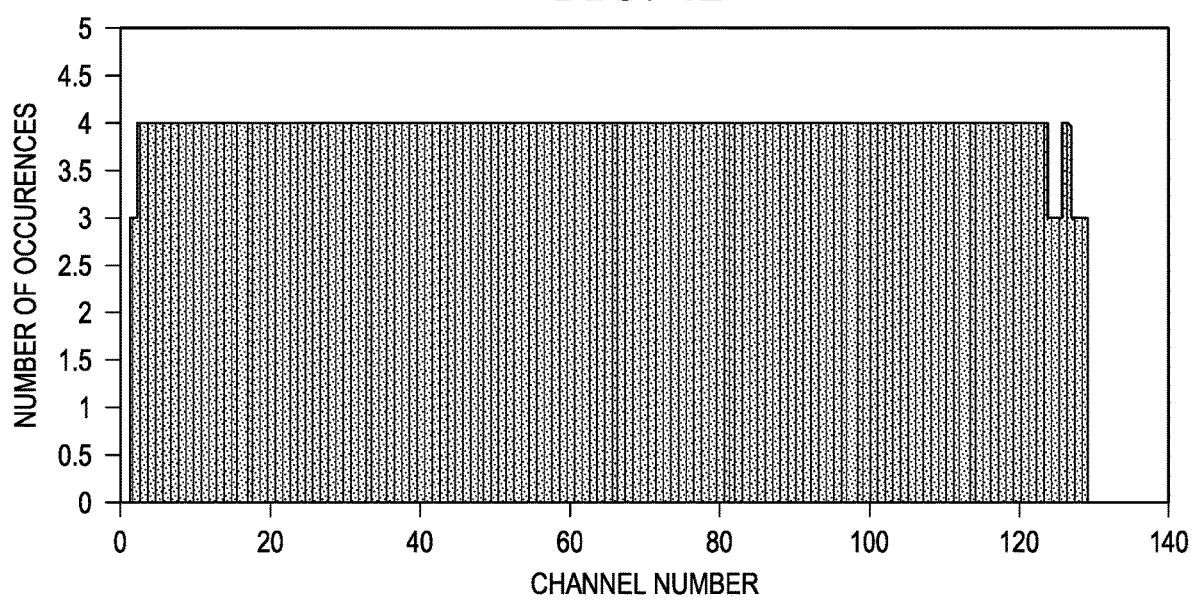
FIG. 4B illustrates an example of distribution of channels using a pseudo random sequence generated by a Linear Feedback Shift Register (LFSR) method and separated by a Frequency Separated Sequence (FSS) method.

Referring to FIG. 4B, an example of distribution of 129 channels using a pseudo random sequence generated by the Linear Feedback Shift Register (LFSR) method and separated by the Frequency Separated Sequence method is illustrated. As illustrated, the uniform distribution of 129 channels is still maintained by the FSS; however, in this case, channels are not closer to each other and the inter channel interference improves significantly. Although the exact number of occurrences of some channels may vary, the separation of adjacent channels significantly improves the inter-channel interference between adjacent transmission channels. In the FSS, the minimum distance between adjacent transmission channels can be determined by the pre-determined threshold and the distance between adjacent transmission channels then can remain the same throughout the transmission session, thereby improving the inter-channel interference and overall transmission system performance. Because the method for separating adjacent transmission channels is deterministic, the method can be repeated for the same sequence.

Following is an example of sequence generate generated by an LFSR method and then separated by the FSS method. A sequence of length 512 generated using the LFSR method for 129 channels is given below:
127 128 64 32 16 6 1 63 94 112 119 58 92 109 117 123 126 63 30 15 70 33 79 104 117 57 27 78 104 50 25 77 39 20 10 3 2 66 31 16 71 36 83 40 18 72 101 113 55 92 109 55 92 46 21 9 67 96 113 121 59 28 77 101 113 121 125 61 29 79 102 49 89 109 55 26 13 69 35 80 40 85 41 21 75 38 17 7 66 98 114 57 27 12 71 98 47 88 107 54 90 45 85 41 83 106 118 59 28 14 72 34 15 72 101 51 24 12 71 36 16 8 69 35 18 9 5 3 2 128 129 65 33 17 7 4 67 34 15 6 68 99 50 25 11 6 68 32 14 70 100 115 56 28 77 39 82 41 83 40 85 107 54 27 12 4 67 96 46 86 106 118 122 61 95 46 21 75 100 48 87 108 119 58 29 79 40 18 9 67 34 82 41 21 9 5 65 33 79 38 84 105 53 91 44 20 73 99 112 119 124 125 61 95 112 54 27 78 37 19 74 35 18 72 34 82 104 50 88 107 116 121 125 127 62 31 80 38 17 73 99 50 88 44 87 42 19 74 102 49 23 76 103 52 26 13 7 4 129 127 64 97 49 23 10 70 100 48 24 75 38 84 42 19 8 69 97 49 89 43 22 74 35 80 103 114 120 123 126 126 63 96 48 22 11 68 32 81 105 53 25 11 68 99 112 56 91 44 87 108 52 26 76 36 83 106 51 24 75 100 115 122 61 29 13 69 97 111 120 123 60 93 111 118 59 94 47 24 12 4 129 65 95 48 87 42 86 106 51 90 108 52 89 109 117 57 93 111 56 28 14 5 3 64 30 80 103 52 89 43 84 105 115 122 124 62 94 47 86 43 84 42 86 43 22 11 6 1 1 63 32 81 39 20 73 37 81 39 82 104 117 123 60 30 78 37 81 105 115 56 91 110 120 60 30 15 8 2 128 62 96 113 55 26 76 103 114 57 93 45 23 76 36 16 71 98 114 120 60 93 45 85 107 116 58 92 46 88 44 20 10 70 33 17 73 37 19 8 2 66 98 47 22 74 102 116 58 29 13 7 66 31 78 102 116 121 59 94 110 53 91 110 53 25 77 101 51 90 45 23 10 3 64 97 111 54 90 108 119 124 62 31 14 5 65 95 110 118 122 124 125

The corresponding FSS sequence using a separation parameter of 2 is shown below:
127 64 32 16 6 1 128 94 63 112 119 58 92 109 117 123 126 63 30 15 70 33 79 104 117 57 27 50 78 25 104 77 39 20 10 3 66 31 16 71 36 2 83 40 18 101 72 113 55 92 109 46 21 9 55 67 92 96 113 121 59 28 77 101 113 121 125 61 29 79 102 49 89 109 55 26 13 69 35 80 40 85 21 75 38 17 41 7 66 98 114 57 27 12 71 98 47 88 107 54 90 45 85 41 83 106 118 59 28 14 72 34 101 51 24 15 12 72 71 36 16 8 69 18 5 35 3 128 9 65 33 17 7 2 4 129 67 15 34 99 50 6 25 11 68 6 68 32 14 70 100 115 56 28 77 39 82 41 85 107 54 27 83 12 40 4 67 96 46 86 106 118 122 61 95 46 21 75 100 48 87 108 119 58 29 79 40 18 9 67 34 82 41 21 9 5 65 33 79 38 84 105 53 91 44 20 73 99 112 119 124 61 95 54 112 27 78 125 37 19 74 35 72 82 104 18 50 88 34 107 116 121 125 127 62 31 80 38 17 73 99 50 88 44 42 19 74 102 87 49 23 76 52 26 103 13 7 4 129 127 64 97 49 23 10 70 100 75 48 38 24 84 42 19 8 69 97 49 89 43 22 74 35 80 103 114 120 123 126 63 96 48 22 11 26 68 32 81 105 53 25 11 68 99 112 56 91 44 87 108 52 26 76 36 83 106 51 24 75 100 115 122 61 29 13 69 97 111 120 123 60 93 118 111 47 24 12 59 4 94 129 65 95 48 87 42 106 51 90 108 86 117 57 93 52 111 89 28 109 14 5 56 3 64 30 80 103 52 89 43 84 105 115 122 124 62 94 47 86 43 84 22 11 6 86 1 42 43 63 32 81 39 20 1 73 37 104 81 82 117 39 123 60 30 78 37 81 105 115 56 91 110 120 60 30 15 8 2 128 62 96 113 55 26 76 103 57 114 93 45 23 76 36 16 71 98 114 120 60 93 45 85 107 116 58 92 46 88 44 20 10 70 33 17 73 37 19 8 2 66 98 47 22 74 102 116 58 29 13 7 66 31 78 102 116 121 59 94 110 53 91 25 77 101 110 51 53 45 90 23 10 3 64 97 111 54 90 108 119 124 62 31 14 5 65 95 110 118 122 124 127

It can be seen from the above example that initially in the random sequence generated using the LFSR method, channels 127 and 128 end up being adjacent channels in the random sequence. Similarly, channel 3 and 2 are also adjacent channels among various other combinations. After the application of the method, the random sequence is rearranged to separate adjacent channels in the random sequence. This results in uniform channel distribution; however, adjacent transmission channels are separated by a distance of at least 2, thereby avoiding inter-channel interference.

Figure 5A:
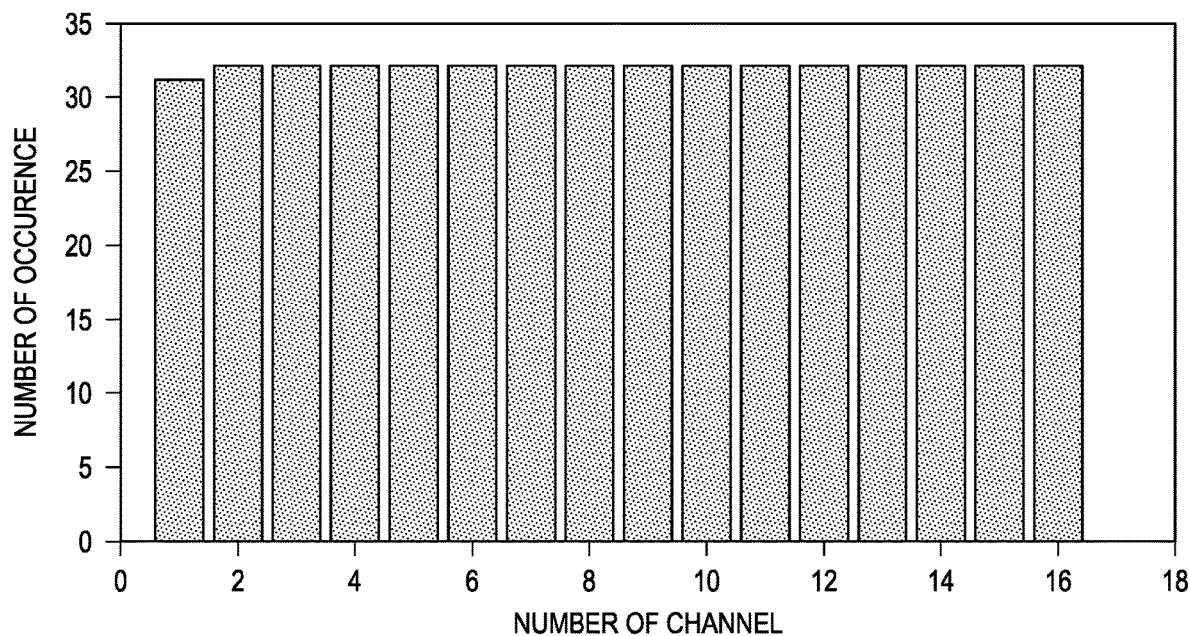
FIG. 5A illustrates an exemplary distribution plot of channels using a LFSR sequence.

Referring to FIG. 5A, an exemplary distribution plot of channels using the LFSR sequence is illustrated. In this example, 16 channels were used for transmission, the number of retransmission of packets was limited to 6, and the number of channels to be separated was within a distance of 2.

Figure 5B:
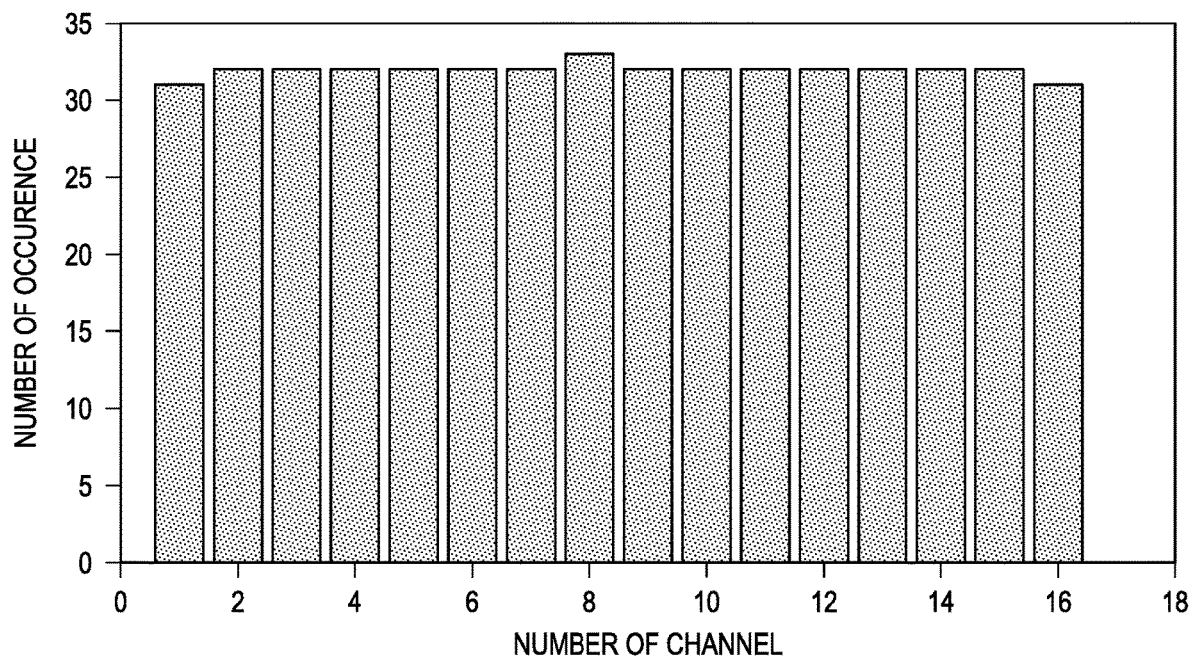
FIG. 5B illustrates an exemplary distribution plot of channels using a LFSR sequence separated by a FSS method.

Referring to FIG. 5B, an exemplary distribution plot of channels using the LFSR sequence and then separated by the FSS method is illustrated. As can be seen form FIGS. 5A and 5B, the distribution of channels remains the same; however, in the example of FIG. 5B, the inter-channel interference was improved by at least 80%.

The foregoing disclosure features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims. Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A device, comprising:
   a transceiver to transmit data packets; and
   a processing unit coupled to the transceiver, the processing unit configured to:
   generate a pseudo random frequency hopping sequence, comprising a plurality of transmission channel numbers, so at least two consecutive transmission channel numbers are each separated by at least a channel threshold distance, wherein the channel threshold distance is a non-zero integer; and wherein the channel threshold distance is selected from a group consisting of: an integer limit on a number of retransmission attempts for a data packet of the data packets and the integer limit on the number of retransmission attempts for the data packet of the data packets minus one; and
   transmit, to at least one other device in a wireless communication network, the data packets via the transceiver, using the pseudo random frequency hopping sequence.

2. The device of claim 1, wherein the processing unit transmits the data packets in the wireless communication network using a wireless communication protocol configured for using the pseudo random frequency hopping sequence.

3. The device of claim 2, wherein the wireless communication protocol is one or more of Bluetooth, IEEE 802.15, or W-Fi wireless communication protocol.

4. The device of claim 1, wherein each one of the transmission channel numbers in the pseudo random frequency hopping sequence corresponds to a transmission frequency band in the wireless communication network.

5. The device of claim 1, wherein the channel threshold distance is further based on a history of packet loss, a maximum expected adjacent channel leakage, or a physical environment of the device.

6. The device of claim 1, wherein the processing unit is further configured to transmit the channel threshold distance periodically.

7. The device of claim 1, wherein the processing unit is further configured to transmit the channel threshold distance asynchronously.

8. The device of claim 1, wherein at least three consecutive transmission channel numbers are each separated by at least the channel threshold distance.

9. A method of frequency hopping in a wireless communication network, the method comprising:
   generating, by a first device in the wireless communication network, a pseudo random frequency hopping sequence for transmission of data packets, the pseudo random frequency hopping sequence comprising a plurality of transmission channel numbers, so at least two consecutive transmission channel numbers are each separated by at least a channel threshold distance, wherein the channel threshold distance is a non-zero integer, and wherein the channel threshold distance is selected from a group consisting of: a limit on a number of retransmission attempts for a data packet of the data packets and the limit on the number of retransmission attempts for the data packet of the data packets minus one; and
   transmitting, by the first device to a second device in the wireless communication network, the data packets using the pseudo random frequency hopping sequence.

10. The method of claim 9, wherein the channel threshold distance is further based on a history of packet loss, a maximum expected adjacent channel leakage, or a physical environment of the first device.

11. The method of claim 9, further comprising transmitting, by the first device, the channel threshold distance, periodically.

12. The method of claim 9, further comprising transmitting, by the first device, the channel threshold distance, asynchronously.

13. The method of claim 9, wherein at least three consecutive transmission channel numbers are each separated by at least the channel threshold distance.

14. A device, comprising:
a transceiver; and
a processing unit coupled to the transceiver, the processing unit configured to:
generate a pseudo random frequency hopping sequence of transmission channel numbers,
add a first transmission channel number from the pseudo random frequency hopping sequence to a frequency separated sequence (FSS) of transmission channel numbers,
add a second transmission channel number of the pseudo random frequency hopping sequence to the FSS of transmission channel numbers immediately after the first transmission channel number, in response to determining that the second transmission channel number is separated from the first transmission channel number, so at least two consecutive transmission channel numbers of the FSS of transmission channel numbers are each separated by at least a channel threshold distance, wherein the channel threshold distance is a non-zero integer, and wherein the channel threshold distance is determined based on a limit on a number of retransmission attempts for a data packet of the data packets,
add the second transmission channel number of the pseudo random frequency hopping sequence to a skipped channel list (SCL), in response to determining that the second transmission channel number is not separated from the first transmission channel number by at least the channel threshold distance,
transmit the channel threshold distance, and
transmit the data packets to a second device in a wireless communication system using the FSS of transmission channel numbers.

15. The device of claim 14, wherein the processing unit transmits the data packets in a wireless communication network via the transceiver using a wireless communication protocol configured for using the FSS.

16. The device of claim 14, wherein each one of the transmission channel numbers in the pseudo random frequency hopping sequence and in the FSS corresponds to a transmission frequency band in a wireless communication network.

* * * * *